United States Patent
Chiang

(10) Patent No.: US 7,136,685 B2
(45) Date of Patent: Nov. 14, 2006

(54) MULTIFUNCTIONAL PORTABLE ELECTRONIC DEVICE

(75) Inventor: Tsung Wei Chiang, Tu-chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 215 days.

(21) Appl. No.: 10/682,333

(22) Filed: Oct. 9, 2003

(65) Prior Publication Data
US 2004/0214619 A1 Oct. 28, 2004

(30) Foreign Application Priority Data
Apr. 25, 2003 (TW) ............................ 92206588 U

(51) Int. Cl.
*H04B 1/38* (2006.01)
(52) U.S. Cl. ............................. 455/575.3; 455/556.1; 455/557; 455/566; 455/575.1; 348/376
(58) Field of Classification Search ............ 455/556.1, 455/556.2, 566, 575.1, 575.3, 556, 557, 575.6; 348/373, 376, 552, 375
See application file for complete search history.

(56) References Cited

U.S. PATENT DOCUMENTS

| | | | |
|---|---|---|---|
| 5,973,915 A | 10/1999 | Evans | |
| 6,177,950 B1 | 1/2001 | Robb | |
| 2002/0086702 A1* | 7/2002 | Lai et al. | 455/556 |
| 2002/0142798 A1* | 10/2002 | Miyake | 455/556 |
| 2004/0204065 A1* | 10/2004 | Kota et al. | 455/556.1 |
| 2005/0107118 A1* | 5/2005 | Makino | 455/556.1 |

FOREIGN PATENT DOCUMENTS

WO WO01/31893 A1 5/2001

\* cited by examiner

*Primary Examiner*—Matthew D. Anderson
*Assistant Examiner*—Tuan Pham
(74) *Attorney, Agent, or Firm*—Wei Te Chung

(57) ABSTRACT

A multifunctional portable electronic device (3) includes a base cover (32), a flip cover (30) pivotally connected with the base cover, and a camera (36) mounted on the flip cover. A vision window (304) is defined through the flip cover, adjacent to the camera. A display (34) is defined on an inner face of the base cover. The vision window is positioned at a location corresponding to the display, when the electronic device is in a closed position. When the electronic device is in the closed position, a user can preview images shown on the display before photographing the user. When the electronic device is in an open position, the user can preview images shown on the display before photographing other objects. The portable electronic device of the present invention allows the user to very conveniently preview pictures before taking them, has a simple structure, and has a low cost manufacturing.

20 Claims, 5 Drawing Sheets

MULTIFUNCTIONAL PORTABLE ELECTRONIC DEVICE

BACKGROUND OF THE INVENTION

1. Field of the Invention

The present invention generally relates to portable electronic devices, and more particularly to a multifunctional portable electronic device, which provides a user with not only voice communications, but also image communications or picture-taking functions.

2. Prior Art

Multifunctional portable personal communication devices, such as mobile phones with video cameras and mobile phones with still cameras, are very popular in current days, since they provide users not only with voice communications, but also image communications, or at least provide the users with picture-taking functions.

However, these existing multifunctional portable personal communication devices, for example, the mobile phones with cameras, have a number of problems. Referring to FIG. 4, a mobile phone 2 disclosed in U.S. Pat. No. 5,973,915 comprises a display 20 and an enclosure 22. The display 20 is connected with the enclosure 22 by a pivot 24 so that the display 20 can rotate with respect to the enclosure 22. The pivot 24 comprises a bushing 26, which contains a miniature video camera 28. The user can preview pictures of him/herself and shown on the display 20 when taking pictures. However, a user can not preview pictures when taking pictures of other objects other than himself, since the video camera 28 and the display 20 point in the same direction.

U.S. Pat. No. 6,177,950 discloses a personal communication device, which provides the user with both voice communications and a picture-taking functions. Referring to FIG. 5, the communication device 1 comprises a display 10, a camera 12, a clip-on enclosure 14, and an adjustment thumbwheel 16 connected to the clip-on enclosure 14. The clip-on enclosure 14 cooperates with the thumbwheel 16, allowing the camera 12 to be adjusted to various working positions by rotating the thumbwheel 16. When the user wants to take pictures of himself/herself, images can be previewed through the display 10, since the display 10 and the camera are normally positioned in the same plane. When the user wants to photograph other objects, the camera 12 can be adjusted by the thumbwheel 16 to point away from a top end of the communication device 1 preview images shown on the display 10 when photographing objects other than the user. However, the electrical connection between the camera 12 and the communication device 1 is vulnerable to disconnection since the camera 12 has to be frequently adjusted from one position to another. In addition, the design of the communication device 1 is quite complicated and the manufacturing cost is high.

WO 01/31893A1 patent application discloses a mobile phone having both a first camera and a second camera. The second camera has a capturing direction essentially different from the capturing direction of the first camera. This invention also solves the problems of previewing either the user or objects other than the user. However, this mobile phone is also too complicated and has a very high manufacturing cost, since it has two cameras.

SUMMARY OF THE INVENTION

Accordingly, an object of the present invention is to provide a multifunctional portable electronic device, which provides a convenient photographic preview function for the user, for use both when photographing the user and when photographing other objects.

Another object of the present invention is to provide a multifunctional portable electronic device, which has a simple structure and has low manufacturing cost.

To achieve the above-mentioned objects, a multifunctional portable electronic device of the present invention includes a base cover, a flip cover pivotally connected with the base cover, and a camera mounted in the flip cover. A vision window is defined through the flip cover adjacent to the camera. A display is defined on an inner face of the base cover. The vision window is positioned at a location corresponding to the display when the electronic device is in a closed position. The user can preview images of him or her on the display as captured by the camera when the electronic device is in the closed position. When the electronic device is in an open position, the user can preview images of other objects on the display as captured by the camera. The portable electronic device of the present invention provides the user with a very convenient preview function before taking pictures, using a simple structure and a low manufacturing cost.

DETAILED DESCRIPTION OF THE INVENTION

Figure 1:
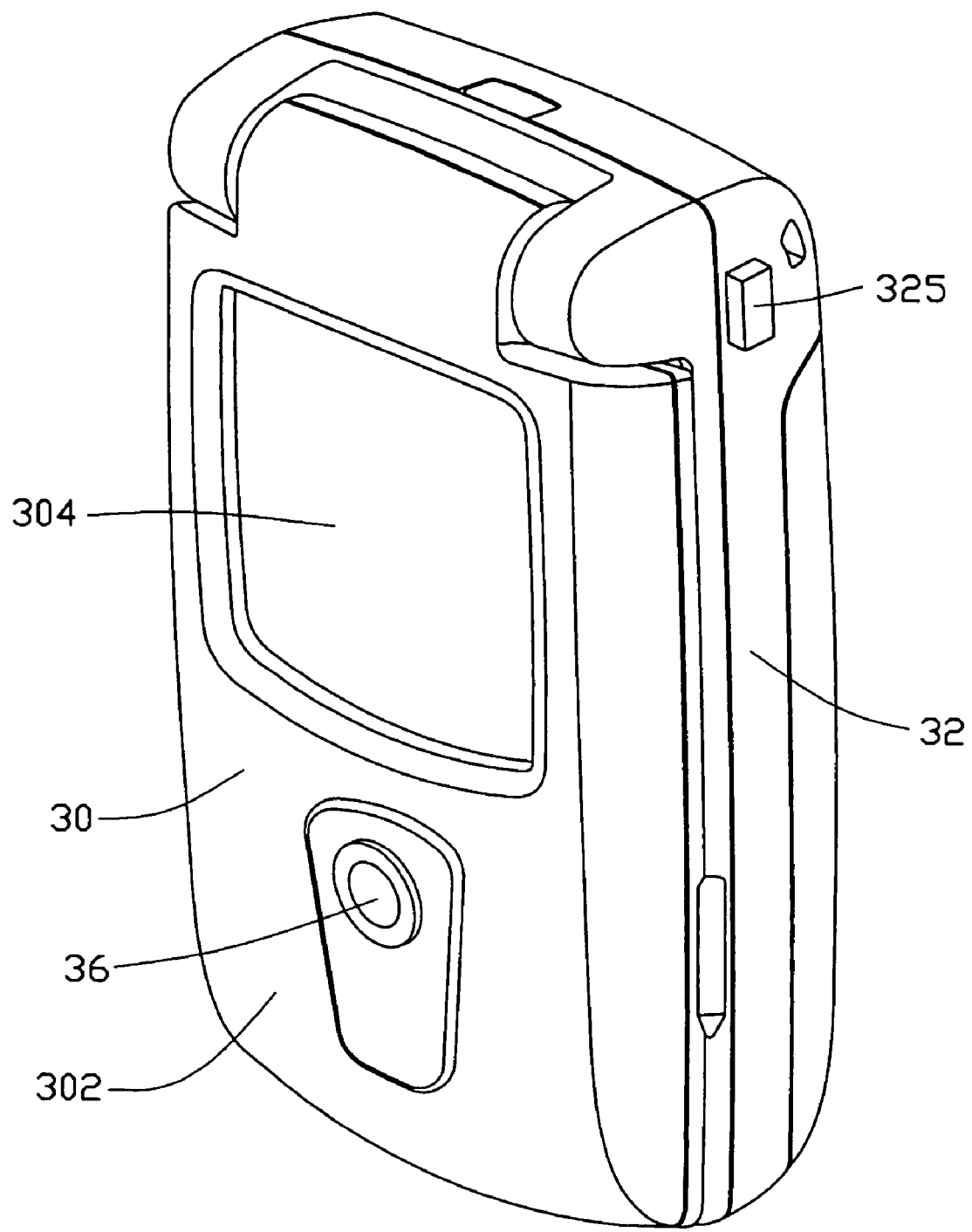
FIG. 1 is a front, right perspective view of a mobile phone with a camera in accordance with a preferred embodiment of the present invention, in which the mobile phone is in a closed position.
Figure 2:
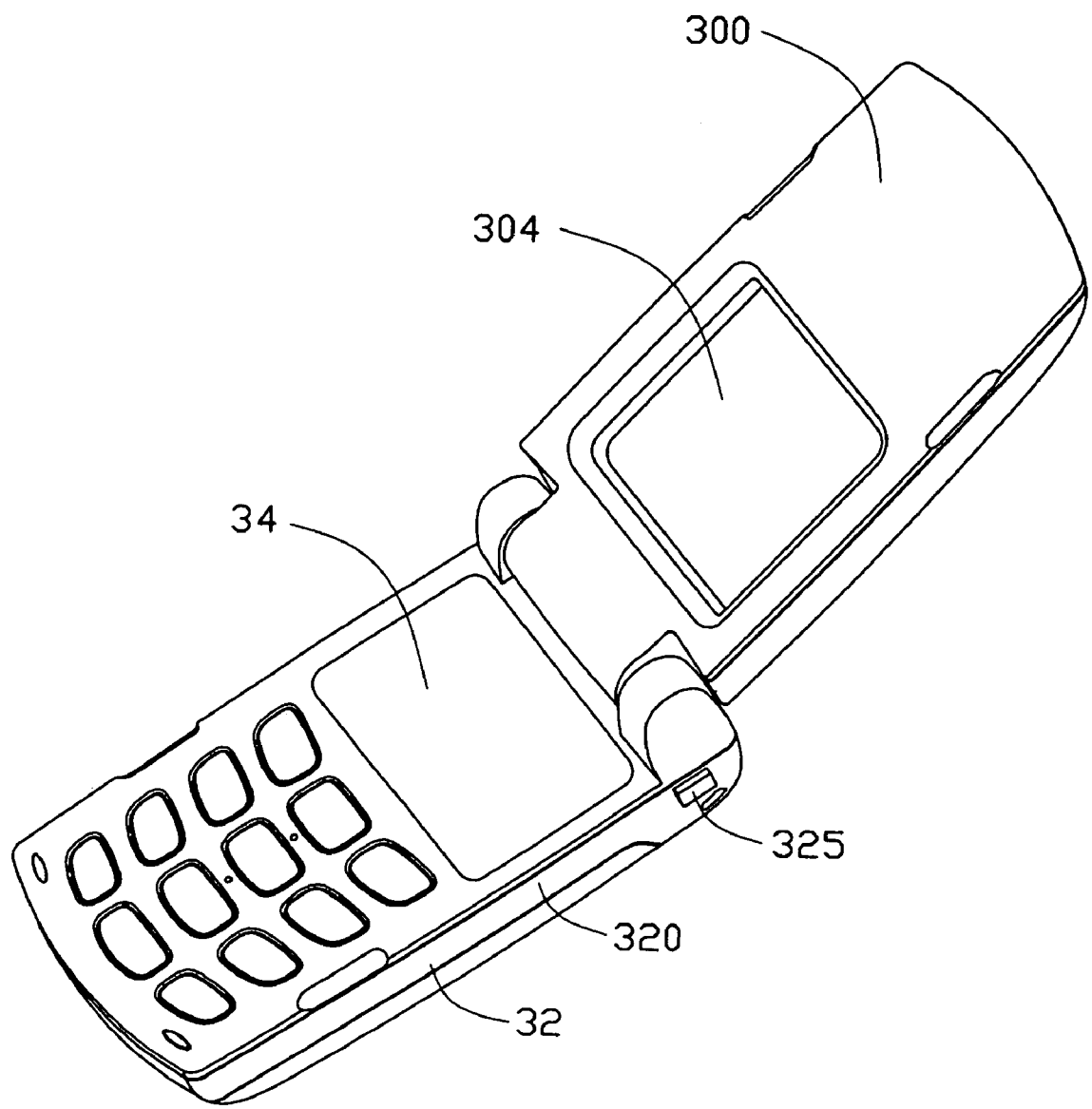
FIG. 2 is a perspective view of the mobile phone of the FIG. 1, in which the mobile phone is in an open position.
Figure 3:
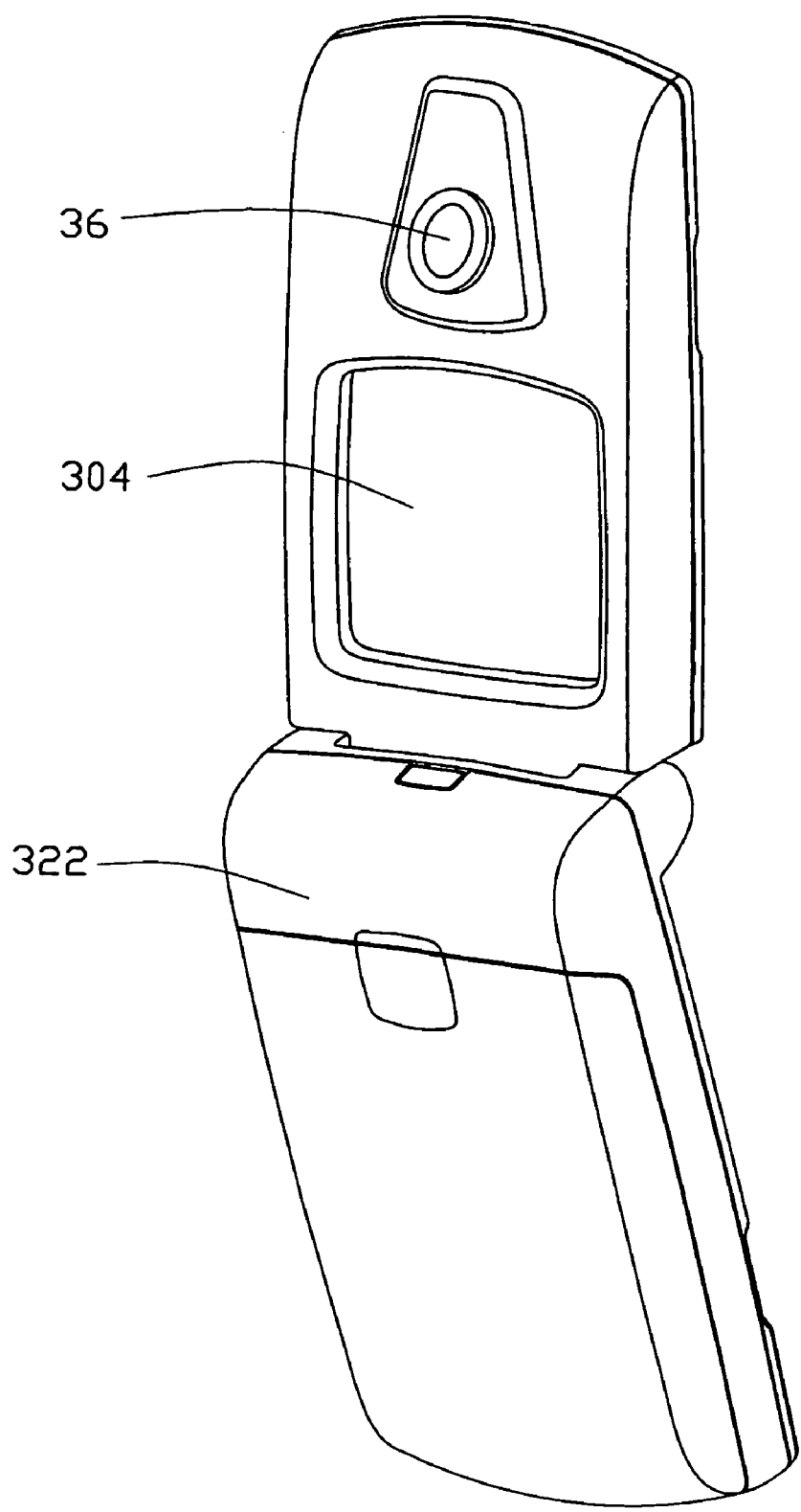
FIG. 3 is another perspective view of the mobile phone of the FIG. 1, also in an open position and viewed from a different angle.
Figure 4:
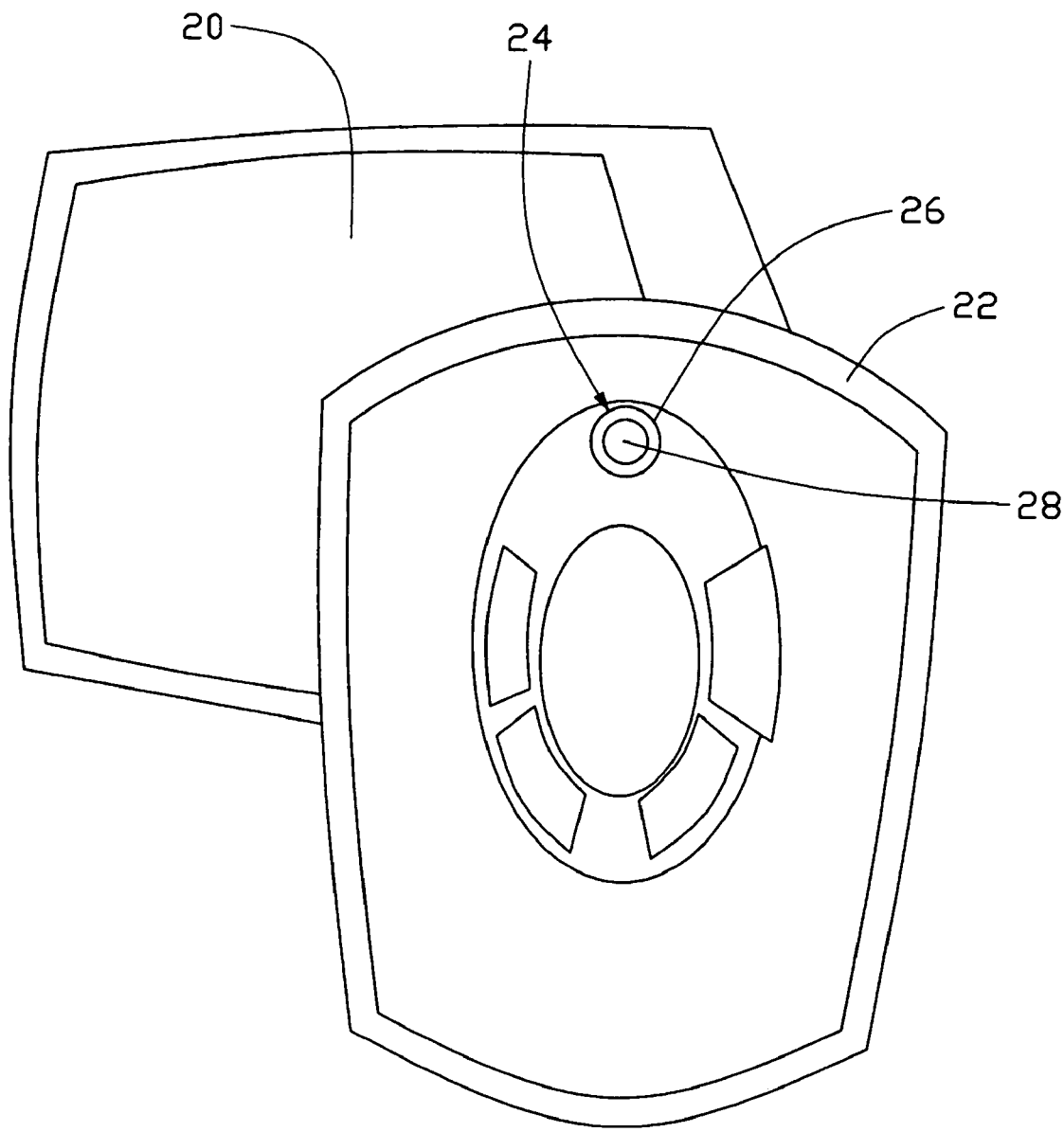
FIG. 4 is a front view of a personal communication device of the prior art.
Figure 5:
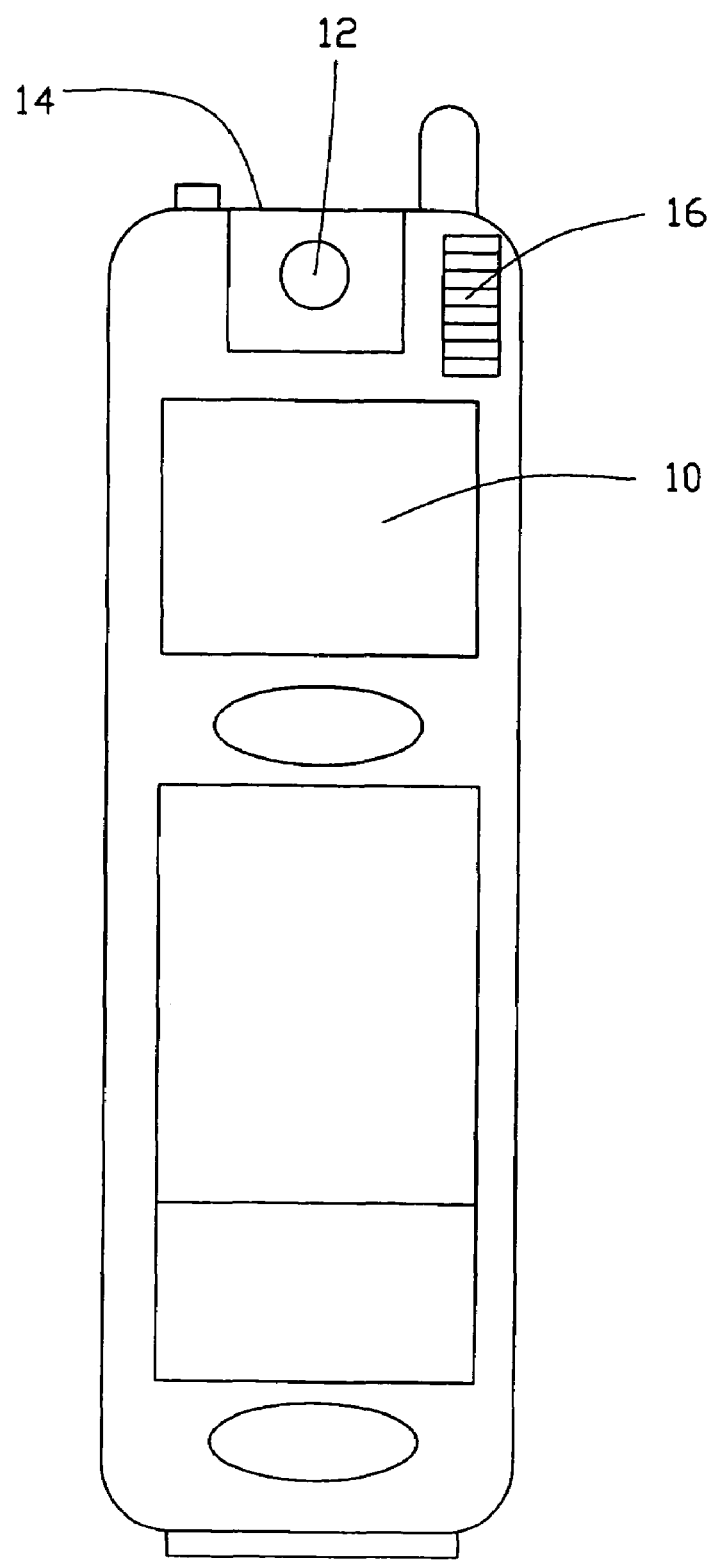
FIG. 5 is a front view of a portable electronic device of the prior art.

Referring to FIGS. 1, 2 and 3, a foldable mobile phone 3 will be taken here as an example to disclose details of a multifunctional portable electronic device according to a preferred embodiment of the present invention. The mobile phone 3 comprises a base cover 32, a flip cover 30, and a digital camera 36 mounted on the flip cover 30.

The base cover 32 comprises an inner face 320 and an outer face 322. A plurality of key buttons (not labeled) protrudes from a lower portion of the inner face 320. A rectangular display 34 for showing messages or images is defined on an upper portion of the inner face 320, adjacent to the key buttons. The base cover 32 receives a main circuit board (not shown) for controlling operations of the mobile phone 3. The main circuit board and other structures of the base cover 32 are similar to those in traditional foldable mobile phones. A shutter button 325 protrudes from a right side (not labeled) of the base cover 32, and is electrically connected with the main circuit board.

The flip cover 30 is pivotally connected with the base cover 32 by a hinge (not shown) at top ends of both the flip cover 30 and the base cover 32. When the flip cover 30 is upwardly turned, the mobile phone 3 is in an open position. When the flip cover 30 is folded downwardly, the mobile phone 3 is in a closed position. The flip cover 30 comprises an outer face 302 and an inner face 300. The flip cover 30 receives a flexible printed circuit board (not shown) therein to be electrically connected with the main printed circuit board in the base cover 32. A vision window 304 is defined through the flip cover 30 for exposing the display 34 to view, when the mobile phone 3 in the closed position. The vision window 304 is located at a position corresponding to the display 34, and has a size identical with that of the display 34. Preferably, the vision window 304 is covered by transparent material, such as glass, polycarbonate, or other material, for esthetical consideration of the mobile phone 3.

The digital camera 36 is built inside the flip cover 30 in a conventional way, with a lens (not labeled) thereof exposed to an outside of the outer face 302 of the flip cover 30. The digital camera 36 is electrically connected with the flexible printed circuit board in the flip cover 30. Accordingly, the digital camera 36 is electrically connected with the main circuit board in the base cover 32. Signals from the digital camera 36 can thus be processed by the main circuit board.

To take pictures of the user, the mobile phone 3 is used in the closed position, as shown in FIG. 1. The user confronts the camera 36, and can preview the image shown on the display 34 through the vision window 304, since the camera 36 and the display 34 face in the same direction. When the user is satisfied with the image, he or she can press the shutter button 325, and the photograph is thus taken. When the user wants to take pictures of objects other than himself or herself, he or she can turn the flip cover 30 upwardly so that the mobile phone 3 is in the open position, as shown in FIG. 3. Then, the camera 36 points toward objects which are to be photographed, and the user can directly preview an image on the display 34. Satisfactory pictures or images are thus obtained using the mobile phone 3.

Compared with other mobile phones with cameras in the prior art, the mobile phone 3 provides the user with a very convenient preview function for use prior to taking pictures, either of the mobile phone user or of other objects. The mobile phone 3 is relatively simple in structure, and has a lower manufacturing cost, since the mobile phone 3 uses the vision window 304 instead of other additional components, such as a second camera.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

I claim:

1. A foldable multifucntional portable electronic device having a first housing and a second housing pivotally connected therewith, comprising:
   means for capturing pictures or images, said means being arranged in an outer face of the first housing of the electronic device;
   a vision window being defined through the first housing, substantially adjacent to said means; and
   a display screen being positioned on an inner face of the second housing of the electronic device, corresponding to the position of the vision window; wherein
   an image shown on the display screen can be previewed through the vision window when the electronic device is in a closed position for photographing a user; and the image can be previewed directly on the display screen when the electronic device is in an open position to photograph other objects.

2. The portable electronic device of claim 1, wherein the vision window is an opening.

3. The portable electronic device of claim 2, wherein the vision window is covered by transparent material.

4. The portable electronic device of claim 3, wherein said transparent material is glass.

5. The portable electronic device of claim 3, wherein said transparent material is a polycarbonate material.

6. The portable electronic device of claim 1, wherein the size of the vision window is identical with that of the display screen.

7. The portable electronic device of claim 1, wherein said means is a camera.

8. The portable electronic device of claim 1, wherein the vision window is a glass, and the display screen is visible trough the vision window when the electronic device is in the closed position.

9. A foldable multifunctional portable electronic device, comprising:
   an upper housing, a vision window being defined through the upper housing;
   a lower housing pivotally connected with the upper housing to form an enclosure of the electronic device, a display for displaying images being defined on an inner face of the lower housing; and
   a camera mounted on an outer face of the upper housing, the camera being juxtaposed with the vision window; wherein
   the display is positioned at a location corresponding to the vision window when the electronic device is in a closed position, so that an image capturing from the camera can be viewed through the vision window.

10. The portable electronic device of claim 9, wherein the vision window is covered by transparent material.

11. The portable electronic device of claim 10, wherein said transparent material is glass.

12. The portable electronic device of claim 10, wherein said transparent material is polycarbonate material.

13. The portable electronic device of claim 9, wherein the size of the vision window is identical with that of the display screen.

14. The portable electronic device of claim 9, wherein a main printed circuit board for controlling operations of the electronic device is received in the lower housing.

15. The portable electronic device of claim 14, wherein a flexible printed circuit board is received in the upper housing, and the flexible printed circuit board is electrically connected with the main printed circuit board.

16. The foldable portable electronic device of claim 15, wherein the camera is electrically connected with the flexible printed circuit board.

17. A portable electronic device, which provides the electronic device user both voice communications and picture-taking functions, comprising:
   a base cover having an inner surface and an outer surface, a display being defined on the inner surface of the base cover;
   a flip cover pivotally connected with the base cover and being pivotable between a first position and a second position relative to the base cover, and
   a camera mounted to the flip cover;
   said camera facing outwardly and able to take pictures of others when the flip cover is moved to the first position, while facing inwardly and able to take pictures of the user when the flip cover is moved to the second position; wherein regardless of whether a picture of another or a picture of the user is being taken, the user can preview the picture on the display through the vision window without obstruction from any portion of the flip cover.

18. The portable electronic device of claim 17, wherein the flip cover has an inner surface and an outer face, and the camera is mounted on the outer face of the flip cover.

19. The portable electronic device of claim 17, wherein the flip cover includes a window in alignment with the display when the flip cover is in the second position.

20. The portable electronic device of claim 17, wherein a pivot axis between the base cover and the flip cover extends along a common edge of the base cover and the flip cover.

* * * * *